(12) United States Patent
Saito et al.

(10) Patent No.: US 11,067,419 B2
(45) Date of Patent: Jul. 20, 2021

(54) THERMAL FLOWMETER

(71) Applicant: HITACHI AUTOMOTIVE SYSTEMS, LTD., Hitachinaka (JP)

(72) Inventors: Tomoaki Saito, Hitachinaka (JP); Masayuki Satou, Hitachinaka (JP); Akira Takasago, Hitachinaka (JP); Noboru Tokuyasu, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/757,614

(22) PCT Filed: Dec. 14, 2018

(86) PCT No.: PCT/JP2018/046040
§ 371 (c)(1),
(2) Date: Apr. 20, 2020

(87) PCT Pub. No.: WO2019/142565
PCT Pub. Date: Jul. 25, 2019

(65) Prior Publication Data
US 2020/0326217 A1 Oct. 15, 2020

(30) Foreign Application Priority Data
Jan. 22, 2018 (JP) .............................. JP2018-008412

(51) Int. Cl.
*G01F 1/684* (2006.01)
*G01F 1/696* (2006.01)

(52) U.S. Cl.
CPC ............ *G01F 1/684* (2013.01); *G01F 1/6842* (2013.01); *G01F 1/696* (2013.01)

(58) Field of Classification Search
CPC ......... G01F 1/684; G01F 1/6842; G01F 1/696
See application file for complete search history.

(56) References Cited

U.S. PATENT DOCUMENTS

| 6,298,720 B1 | 10/2001 | Mueller et al. |
| 2001/0006005 A1* | 7/2001 | Sato ...................... G01F 1/6842 73/204.22 |

(Continued)

FOREIGN PATENT DOCUMENTS

| JP | 2001-504943 A | 4/2001 |
| JP | 2002-005713 A | 1/2002 |

(Continued)

OTHER PUBLICATIONS

International Search Report, PCT/JP2018/046040, dated Mar. 12, 2019, 2 pgs.

*Primary Examiner* — Ryan D Walsh
(74) *Attorney, Agent, or Firm* — Volpe Koenig (57) ABSTRACT

Provided is a thermal flowmeter that can achieve both measurement accuracy and antifouling performance with a simple and space-saving passage structure. In the thermal flowmeter of the invention, a housing is disposed in a main passage through which a gas to be measured flows, and the gas to be measured is taken from the main passage into an auxiliary passage provided in a housing, and a flow rate detection unit disposed in the auxiliary passage measures a flow rate of the gas to be measured. The auxiliary passage includes an inlet opening that opens to be inclined with respect to the main flow direction of the gas to be measured flowing through the main passage, and an inclined passage that extends in a direction inclined with respect to the main flow direction of the gas to be measured flowing from the inlet opening through the main passage.

6 Claims, 12 Drawing Sheets

(56) References Cited

U.S. PATENT DOCUMENTS

| | | | |
|---|---|---|---|
| 2001/0037678 A1 | 11/2001 | Kamiya | |
| 2003/0094041 A1 | 5/2003 | Iwaki et al. | |
| 2007/0107511 A1 | 5/2007 | Strohrmann et al. | |
| 2008/0016959 A1* | 1/2008 | Nakano | G01F 1/6842 73/204.26 |
| 2010/0242589 A1* | 9/2010 | Morino | G01F 1/6842 73/202.5 |
| 2013/0061684 A1 | 3/2013 | Frauenholz et al. | |
| 2013/0192354 A1* | 8/2013 | Kaifu | G01F 1/6842 73/114.32 |
| 2018/0313680 A1 | 11/2018 | Fukaya et al. | |

FOREIGN PATENT DOCUMENTS

| | | |
|---|---|---|
| JP | 2003-176740 A | 6/2003 |
| JP | 2017-083304 A | 5/2017 |

\* cited by examiner

THERMAL FLOWMETER

TECHNICAL FIELD

The invention relates to a thermal flowmeter that measures a flow rate of a gas to be measured flowing through a main passage, for example.

BACKGROUND ART

Conventionally, various thermal flowmeters have been proposed in which a housing is arranged in a main passage through which a gas to be measured flows, a gas to be measured is taken in from the main passage to an auxiliary passage provided in the housing, and a flow rate of the gas to be measured is measured by a flow rate detection unit disposed in the auxiliary passage. The thermal flowmeter has a configuration for measuring the mass flow rate of the gas to be measured by performing heat transfer between the flow rate detection unit and the gas to be measured.

In the thermal flowmeter, an auxiliary passage structure such as centrifugal separation by a cyclone bypass or inertial separation by a branch passage is adopted from the viewpoint of pollution control. For example, PTL 1 discloses a structure of a thermal flowmeter having a cyclone bypass.

CITATION LIST

Patent Literature

PTL 1: US 2013/0061684

SUMMARY OF INVENTION

Technical Problem

However, the structure of the cyclone bypass and the auxiliary passage having the branch passage is complicated, and it is difficult to reduce the size of the device. In particular, in a case where the main passage to which the device is attached is a small-diameter passage having a small cross-sectional area, there is a concern about that a part of the device may protrude greatly from the main passage to the outside, so that the layout position is limited and the usability is deteriorated.

The invention has been made in view of the above problems, and an object of this invention is to provide a thermal flowmeter capable of achieving both measurement accuracy and antifouling performance by a simple and space-saving passage structure.

Solution to Problem

In a thermal flowmeter of this invention that solves the above-mentioned problems, a housing is disposed in a main passage through which the gas to be measured flows, and the gas to be measured is taken from the main passage into an auxiliary passage provided in the housing, and a flow rate of the gas to be measured is measured by a flow rate detection unit disposed in the auxiliary passage. The auxiliary passage includes an inlet opening that opens to be inclined with respect to a main flow direction of the gas to be measured flowing through the main passage, and an inclined passage portion that extends in a direction inclined with respect to the main flow direction of the gas to be measured flowing through the main passage from the inlet opening.

Advantageous Effects of Invention

According to this invention, compared with the conventional structures, such as a cyclone bypass and a branch passage, size reduction by height reduction is possible, and measurement accuracy and antifouling performance can be made compatible.

Other features of the invention will be clear from the description and the accompanying drawings. In addition, objects, configurations, and effects besides the above description will be apparent through the explanation on the following embodiments.

BRIEF DESCRIPTION OF DRAWINGS

FIG. 2 is a diagram illustrating a state in which the thermal flowmeter according to the first embodiment is attached to a secondary air passage, in which

FIG. 4 is a diagram for describing the configuration of the thermal flowmeter according to the first embodiment, in which

FIG. 8 is an enlarged view of a main part of the thermal flowmeter, in which

DESCRIPTION OF EMBODIMENTS

Hereinafter, embodiments of the invention will be described using the drawings.

First Embodiment

Figure 1:
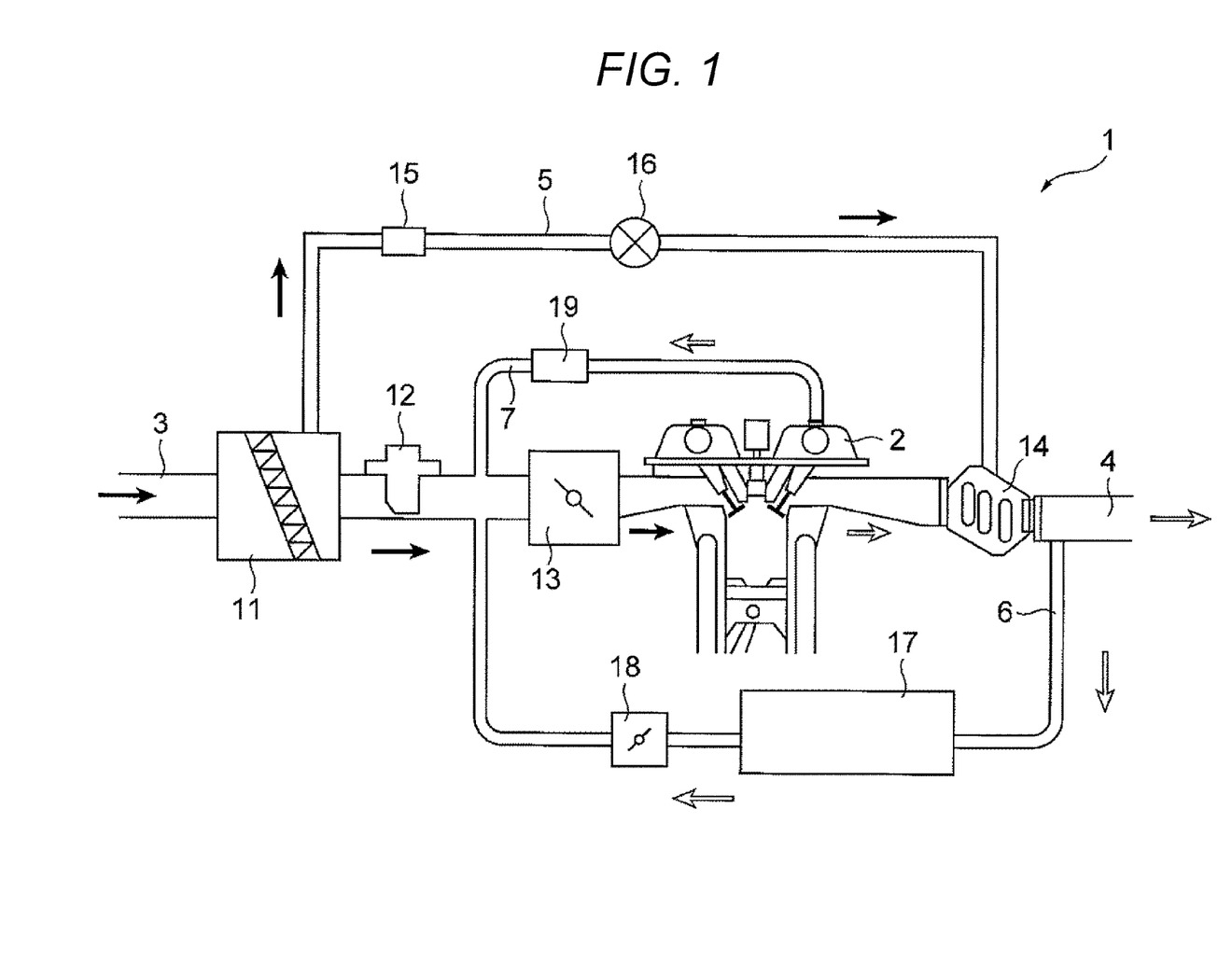
FIG. 1 is a conceptual diagram illustrating an example of an internal combustion engine system to which a thermal flowmeter according to this invention is applied.

FIG. 1 is a conceptual diagram illustrating an example of an internal combustion engine system to which a thermal flowmeter according to the invention is applied. An internal combustion engine system 1 illustrated in FIG. 1 is, for example, an engine system mounted on an automobile as a motor for an automobile, and uses a so-called direct injection type engine 2 which directly injects fuel such as gasoline into a combustion chamber and ignites the fuel by an ignition plug.

In the direct injection type engine 2, the intake passage 3 is connected to an intake side, and an exhaust passage 4 is connected to an exhaust side. The intake passage 3 is provided with an air cleaner 11, an air flow sensor 12, and a throttle valve 13 in order from the upstream side. The air flow sensor 12 detects a flow rate of intake air flowing through the intake passage 3 and flowing into the combustion chamber of the direct injection type engine 2.

In the exhaust passage 4, a GPF (gasoline particulate filter) 14 is provided. The GPF 14 has a configuration that captures PM (particle matter) contained in exhaust gas and burns and removes it by receiving supply of secondary air. The air cleaner 11 and the GPF 14 are connected by a secondary air passage 5 for supplying the secondary air to the GPF 14. The secondary air passage 5 is configured by a small-diameter passage having a smaller sectional area than the intake passage 3. In the secondary air passage 5, a thermal flowmeter 15 and a secondary air pump 16 are arranged. The secondary pump 16 supplies the secondary air from the air cleaner 11 to the GPF 14 through the secondary air passage 5, and the thermal flowmeter 15 detects the flow rate of the secondary air.

The internal combustion engine system 1 has an engine control unit (ECU) (not illustrated), and controls a fuel injection amount directly injected into the combustion chamber from an injector of the direct injection type engine 2 based on the flow rate of the intake air detected by the air flow sensor 12, and also controls the amount of the secondary air to be supplied from the secondary air pump 16 to GPF 14 based on the flow rate of the secondary air detected by the thermal flowmeter 15.

In the internal combustion engine system 1, the intake passage 3 and the exhaust passage 4 are connected by an EGR passage 6, and an intercooler 17 and an EGR valve 18 are provided in the middle of the passage. In addition, a blow-by gas passage 7 connects the intake passage 3 to the inside of the engine case of the direct injection type engine 2, and a PCV valve 19 is provided in the passage.

Figure 2A:
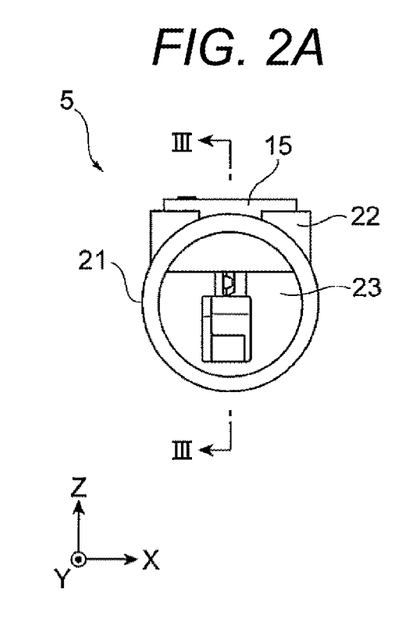
FIG. 2A is a left side view illustrating the secondary air passage from the upstream end side.
Figure 2B:
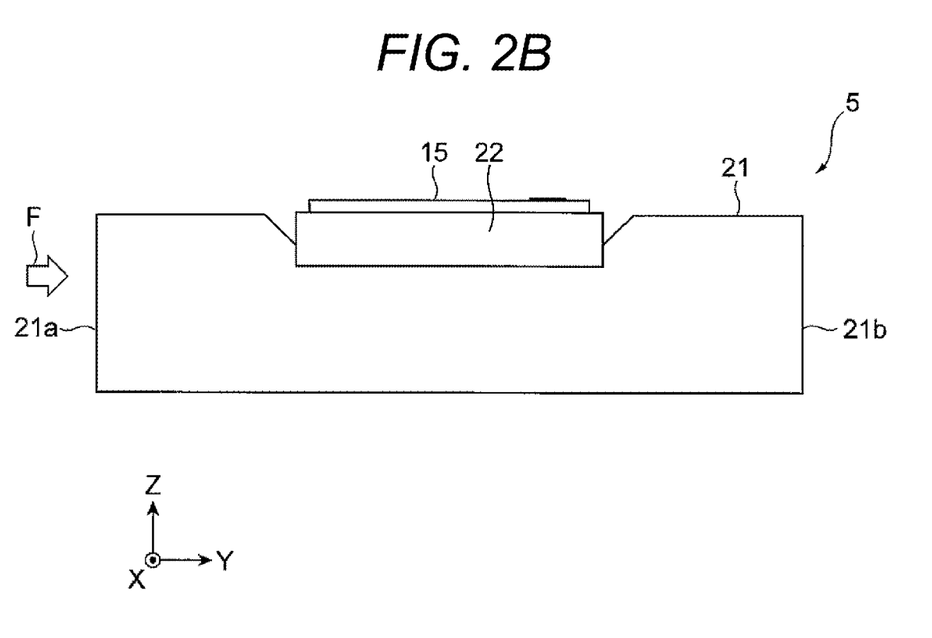
FIG. 2B is a front view.
Figure 3:
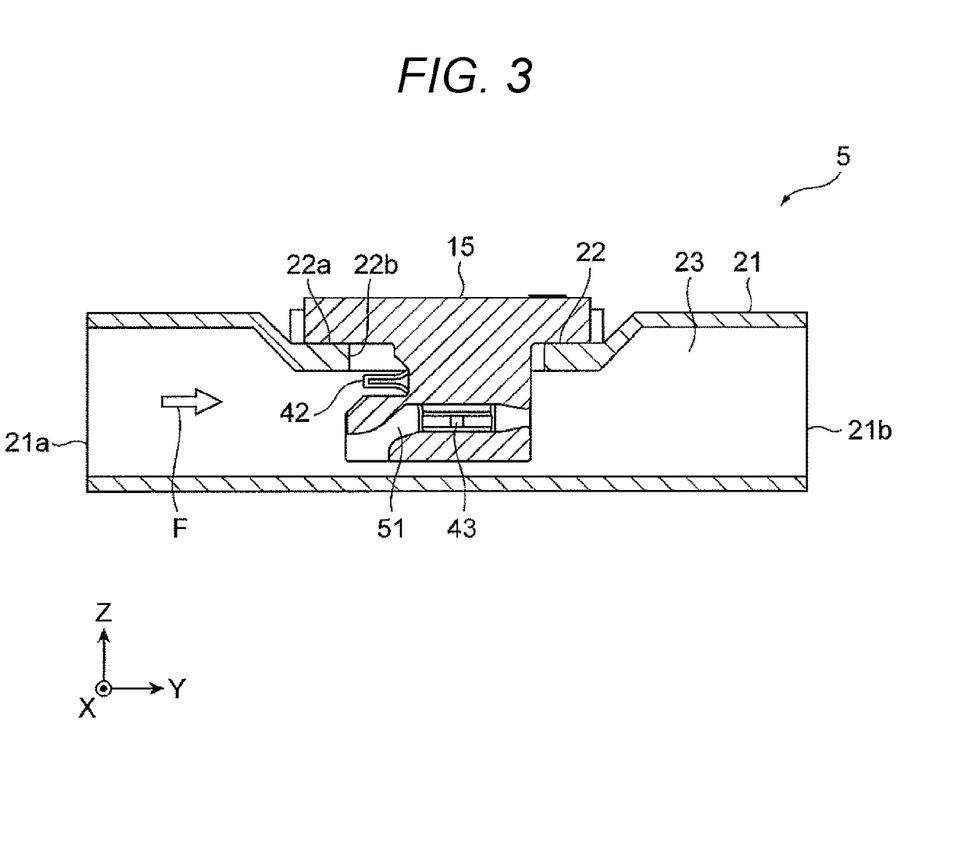
FIG. 3 is a cross-sectional view taken along line III-III of FIG. 2A.

FIG. 2 is a diagram illustrating a state in which the thermal flowmeter according to the first embodiment is attached to a secondary air passage. FIG. 2A is a left side view illustrating the secondary air passage when viewed from an upstream end side, and FIG. 2B is a front view. FIG. 3 is a cross-sectional view taken along line III-III of FIG. 2A.

The secondary air passage 5 includes a cylindrical passage body 21, as illustrated in FIG. 2. The passage body 21 has one end 21a connected to the air cleaner side of the secondary air passage 5 and the other end 21b connected to the GPF 14 side. Inside the passage body 21, there is provided a main passage 23 through which the gas to be measured flows from one end 21a toward the other end 21b. The main passage 23 has a smaller cross-sectional area than a cross-sectional area of the intake passage 3 where the air flow sensor 12 is attached.

In the following description, in order to help understanding of the structure of the secondary air passage 5 and the thermal flowmeter 15, the Y direction along the main flow direction F of the gas to be measured is set to a front-rear direction, and the X direction orthogonal to the Y direction is set to a horizontal direction, and a Z direction orthogonal to the X direction and the Y direction is described as a vertical direction, but these directions are for convenience of description, and do not limit the posture state of the passage body 21 and the thermal flowmeter 15.

At an intermediate position in the front-rear direction of the passage body 21, a mounting portion 22 for mounting the thermal flowmeter 15 is provided. The mounting portion 22 has a flat surface 22a in which a part of the outer peripheral surface is recessed downward and formed flat in the upper part of the passage body 21. An opening 22b that penetrates the passage wall of the passage body 21 and communicates with the main passage 23 is provided in the flat surface 22a of the mounting portion 22 so as to open. The mounting portion 22 is configured such that a part of the thermal flowmeter 15 is inserted into the opening hole 22b, and the thermal flowmeter 15 can be mounted in a state where the thermal flowmeter 15 is disposed in the main passage 23 of the passage body 21.

Figure 4A:
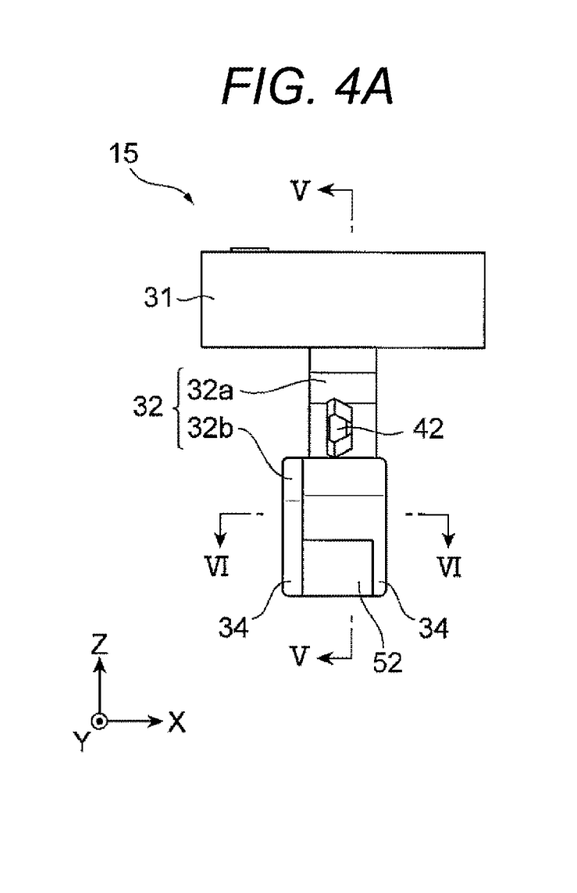
FIG. 4A is a left side view.
Figure 4B:
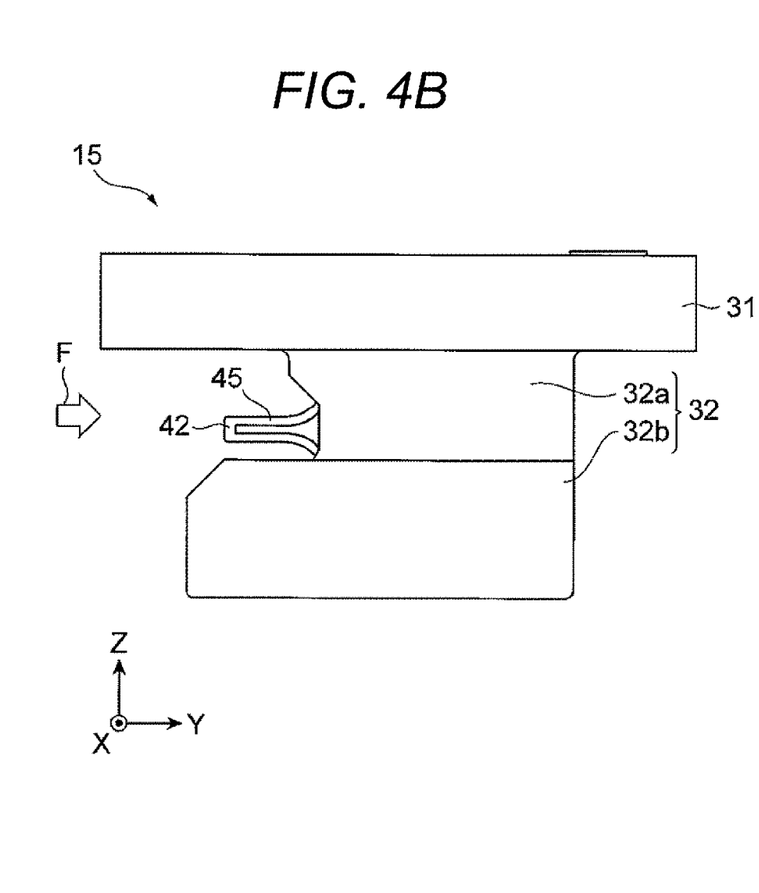
FIG. 4B is a front view.
Figure 5:
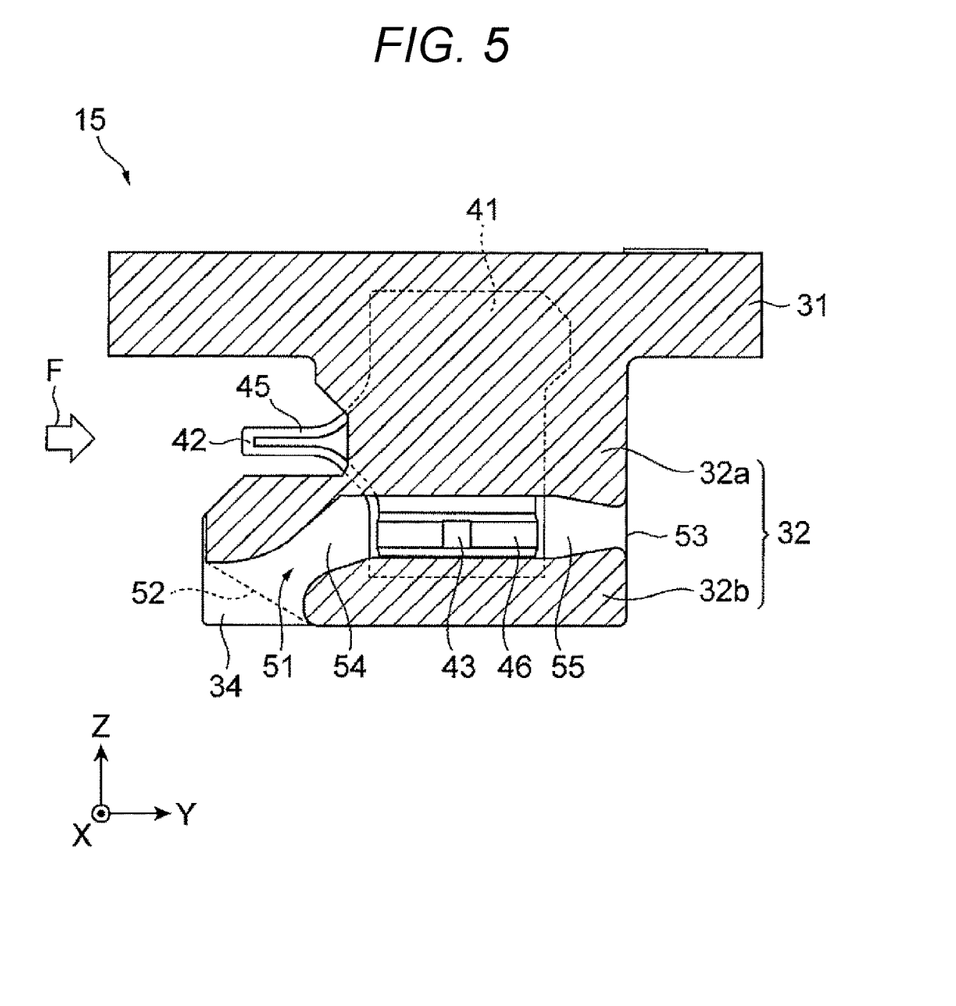
FIG. 5 is a cross-sectional view taken along line V-V of FIG. 4A.
Figure 6:
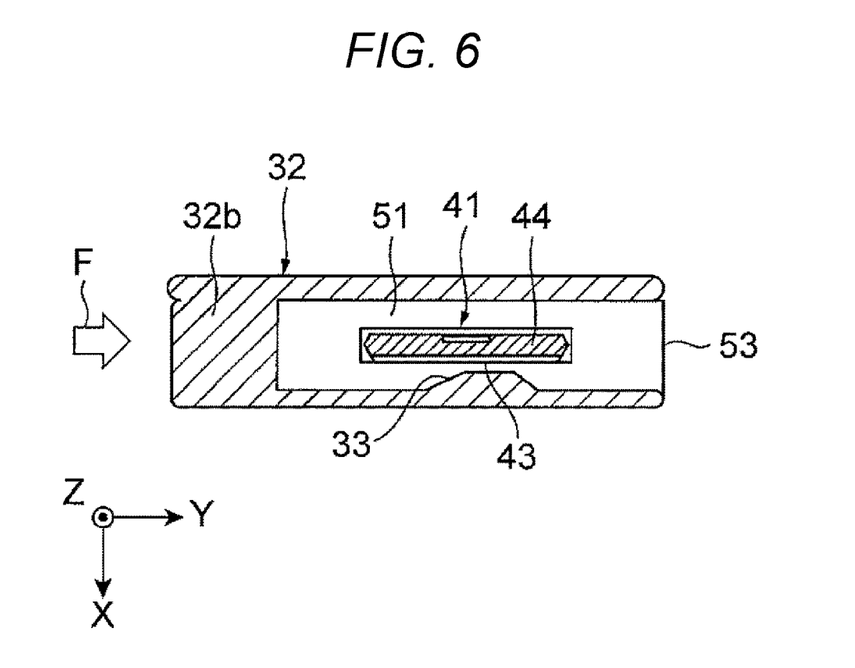
FIG. 6 is a cross-sectional view taken along line VI-VI of FIG. 4A.

FIG. 4 is a diagram for describing the configuration of the thermal flowmeter according to the first embodiment. FIG. 4A is a left side view, and FIG. 4B is a front view. FIG. 5 is a cross-sectional view taken along line V-V of FIG. 4A, and FIG. 6 is a cross-sectional view taken along line VI-VI of FIG. 4A.

The thermal flowmeter 15 includes a pedestal 31 fixed to the mounting portion 22 of the passage body 21, and a housing 32 which protrudes downward from the pedestal 31 and is inserted to the opening 22b of the mounting portion 22 so as to disposed in the main passage 23 of the passage body 21. The pedestal 31 has a flat plate shape having a predetermined plate thickness, faces the flat surface of the mounting portion 22, and is fixed to the mounting portion 22 in a state where the main passage 23 of the passage body 21 is sealed.

The housing 32 has a size larger in the front-rear direction (Y direction) along the main flow direction F of the gas to be measured flowing through the main passage 23 than that in the lateral direction (X direction) facing the main flow direction F of the gas to be measured flowing through the main passage 23, and has a shape extending along the main direction F of the gas to be measured flowing through the main passage 23.

The housing 32 has a base portion 32a provided continuously with the mounting portion 22, and a tip portion 32b provided continuously with the base portion 32a. As illustrated in FIG. 4B, the base portion 32a and the tip portion 32b of the housing 32 are formed such that the tip portion 32b located on the downward side protrude forward from the base portion 32a located on the upstream side, and the length in the front-rear direction (Y direction) is large. Then, as illustrated in FIG. 4A, a step is provided between the base portion 32a located on the upper side and the tip portion 32b located on the lower side, and the tip portion 32b has the shape that is wider in the lateral direction (X direction) than the base portion 32a.

As illustrated in FIG. 5, the housing 32 includes a temperature detection unit 42 disposed at the base portion 32a and a flow rate detection unit 43 disposed at the tip portion 32b. The temperature detection unit 42 is disposed at a tip portion of a protruding portion 45 protruding forward from the base portion 32a of the housing 32. Therefore, the gas to be measured flowing through the main passage 23 can be brought into direct contact with the temperature detection unit 42, and the accurate temperature of the gas to be measured can be detected. In addition, since the temperature detection unit 42 can be disposed at a position away from the base portion 32a of the housing 32, the influence of heat transmitted from the pedestal 31 can be reduced.

In addition, the tip portion of the protruding portion 45 is disposed at a position behind the front end of the tip portion 32b of the housing 32. Therefore, in the operation of attaching the thermal flowmeter 15 to the passage body 21, the tip portion 32b protects the temperature detection unit 42 from surrounding members, and it is possible to prevent the temperature detection unit 42 from being damaged by unintended contact with other members in advance.

The flow rate detection unit 43 is disposed in an auxiliary passage 51 formed in the tip portion 32b of the housing 32. As illustrated in FIG. 5, the auxiliary passage 51 for taking in a part of the gas to be measured flowing through the main passage 23 is provided at the tip portion 32b of the housing 32.

The auxiliary passage 51 is formed so as to extend in the front-rear direction between an inlet opening 52 opening forward and an outlet opening 53 opening rearward. The auxiliary passage 51 is defined as a passage having a closed cross section such as a rectangle or a circle whose upper, lower, left and right sides are surrounded by a wall surface. The inlet opening 52 is formed at the upstream end of the auxiliary passage 51. The outlet opening 53 is formed at the downstream end of the auxiliary passage 51.

Figure 8A:
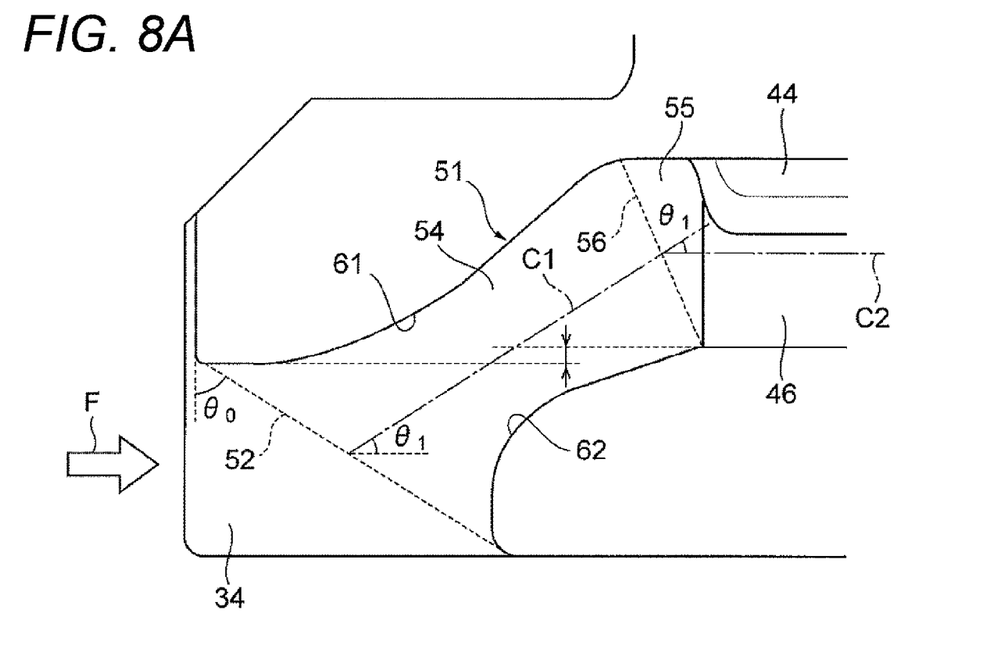
FIG. 8A is a diagram for describing the configuration of an inlet opening and an inclined passage.
Figure 8B:
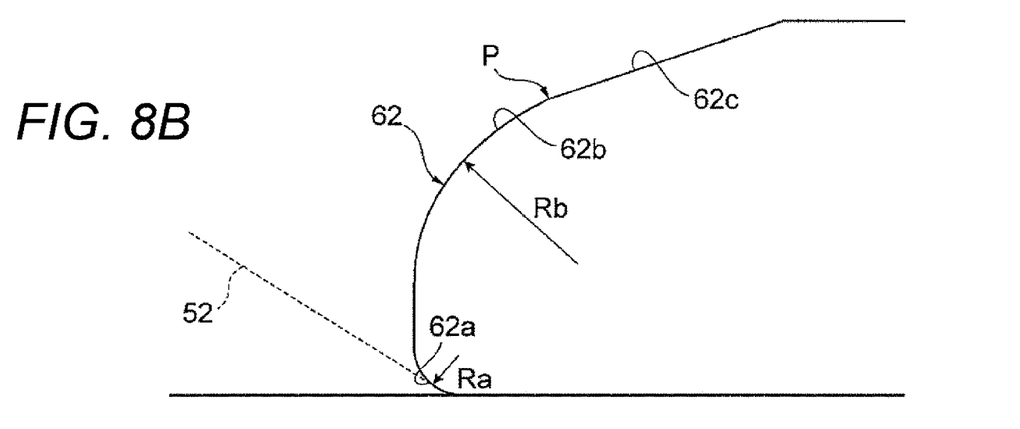
FIG. 8B is a diagram of an introduction surface.

FIG. 8 is an enlarged view of a main part of the thermal flowmeter, FIG. 8A is a diagram for describing the configuration of an inlet opening and an inclined passage, and FIG. 8B is a diagram of an introduction surface.

The inlet opening 52 of the auxiliary passage 51 opens at an angle to the main flow direction F of the gas to be measured flowing through the main passage 23. The inlet opening 52 is formed at an angle $\theta_0$ with respect to a direction orthogonal to the main flow direction F so as to open in a direction away from the pedestal 31. The inlet opening 52 has a lower end located rearward than an upper end, and opens forward and obliquely downward so as to have a predetermined depression angle. The outlet opening 53 opens at the rear end of the tip portion 32b of the housing 32 (see FIG. 5). The outlet opening 53 opens orthogonally to the main flow direction F of the gas to be measured flowing through the main passage 23.

The auxiliary passage 51 includes an inclined passage 54 extending in a direction inclined with respect to the main flow direction F of the gas to be measured flowing from the inlet opening 52 through the main passage 23, and a parallel passage portion 55 extending parallel to the main flow direction F of the gas to be measured continuously with the rear end 56 of the inclined passage 54 and connected to the outlet opening 53.

The inclined passage 54 is disposed such that a center line C1 of the inclined passage 54 is inclined by an angle $\theta_1$ with respect to the front-rear direction (Y direction) so as to gradually approach the pedestal 31 of the housing 32 as it moves backward from the inlet opening 52. The angle $\theta_1$ of the inclined passage portion 54 is preferably 25° or more and 70° or less, more preferably as gentle as possible so as to reduce the bending loss, and is set to 33° in this embodiment.

The center line C1 of the inclined passage 54 is a straight line connecting the center point of the inlet opening 52 and the center point of the rear end 56 of the inclined passage 54. A center line C2 of the parallel passage portion 55 is a straight line extending in the front-rear direction (Y direction) and connecting the center point of the rear end 56 of the inclined passage portion 54 and the center point of the outlet opening 53.

An upper surface 61 of the inclined passage portion 54 gradually approaches the center line C1 of the inclined passage portion 54 as it moves backward from the inlet opening 52, and is curved convexly so as to be separated from the center line C1 again at an intermediate position. The upper surface 61 of the inclined passage portion 54 is curved with a relatively large curvature radius, so that a separation vortex can be prevented from being generated when the gas to be measured passes.

As illustrated in FIG. 8A, a lower surface 62 of the inclined passage portion 54 has the upper end of the lower surface 62 disposed above the upper end of the inlet opening 52, and can guide the gas to be measured that has flowed into the auxiliary passage 51 from the inlet opening 52 to be changed obliquely. Therefore, the inclined passage portion 54 can prevent the contaminants flowing together with the gas to be measured from the inlet opening 52 into the auxiliary passage 51 from directly reaching the flow rate detection unit 43 along the Y direction. The antifouling performance of the portion 43 can be ensured.

Figure 9:
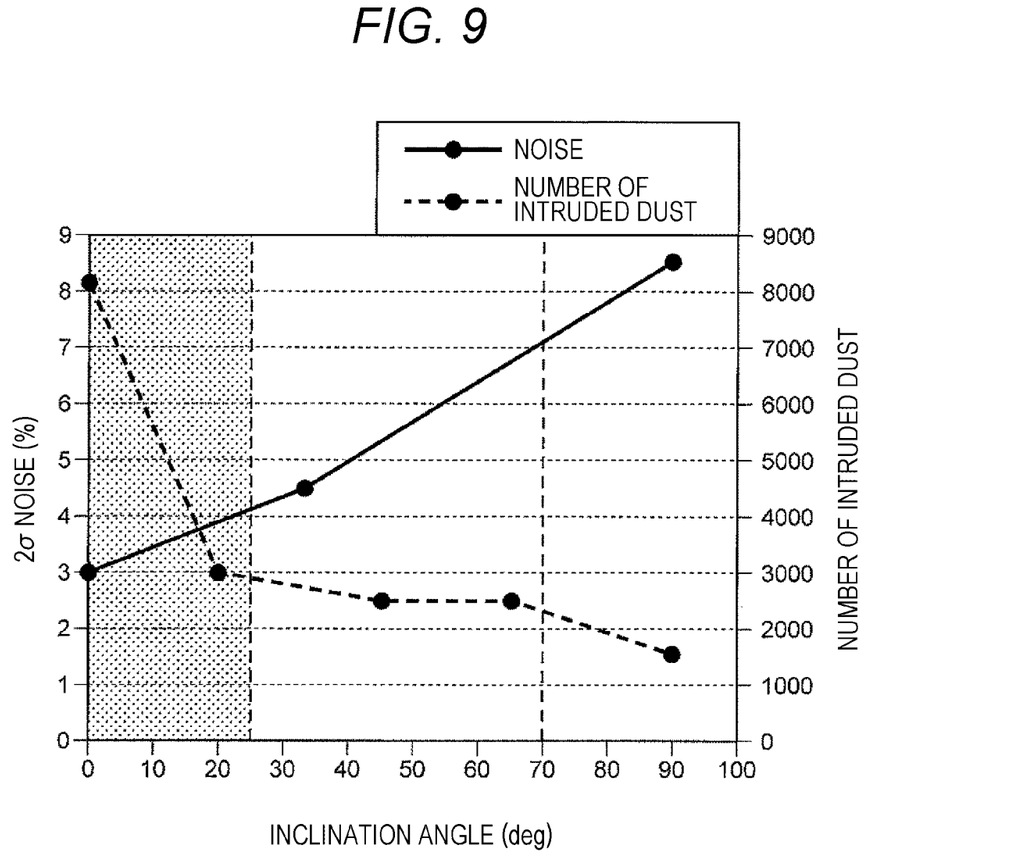
FIG. 9 is a graph illustrating dust analysis results and noise test results with respect to an inclination angle of an inclined passage portion.

FIG. 9 is a graph illustrating a dust analysis result and a noise test result with respect to the inclination angle of the inclined passage portion.

According to the dust analysis result illustrated in FIG. 9, the inclined passage 54 has a tendency that the number of dusts entering the inclined passage 54 (the number of intruded dusts) decreases as the inclination angle increases. In particular, when the angle $\theta_1$ of the inclined passage portion 54 is in the range of 0° to 25°, the number of intruding dust changes rapidly, and in the range of 25° to 90°, it changes gradually. The range where the angle $\theta_1$ of the inclined passage portion 54 is 0° to 25° is a range where the parallel passage portion 55 is exposed in a case where the inlet opening 52 is viewed from the upstream side, and a relatively large amount of dust invades. Therefore, from the viewpoint of stain resistance, it is preferable that the angle $\theta_1$ of the inclined passage 54 is set in the range of 25° to 70° so that the parallel passage portion 55 is not exposed when the inlet opening 52 is viewed from the upstream side.

According to the noise test results illustrated in FIG. 9, the inclined passage 54 shows a tendency that the noise of the flow rate (2σ noise %) detected by the flow rate detection unit increases as the inclination angle increases. The reason why the smaller the angle $\theta_1$ of the inclined passage 54 is, the better the flow rate detection accuracy is, is that (1) the effect of the separation vortex is small because the bend of the inclined passage 54 with respect to the main flow direction is small, and (2) the flow rate is fast, so it is considered that it is superior in S/N ratio.

Table 1 below summarizes the effects of the angle of the inclined passage 54 on the noise performance and the antifouling performance.

TABLE 1

|  | Phenomenon in passage | 0° | Around 33° | 90° |
| --- | --- | --- | --- | --- |
| Noise performance | Suppression of separation vortex | ⊙ | ○ | X |
|  | Flow velocity | ⊙ | ○ | X |
| Antifouling performance | Bypass (diverting flow) | X | ○ | ⊙ |

As for the noise performance, the smaller angle $\theta_1$ of the inclined passage 54 is better for the performance because the generation of the separation vortex is suppressed and the flow velocity is high as a phenomenon in the passage. On the contrary, when the angle $\theta_1$ is large, the performance deteriorates. When the angle $\theta_1$ of the inclined passage 54 is large, dust is diverted as a phenomenon in the passage and bypasses the flow rate detection unit, so that the antifouling performance is improved. On the contrary, when the angle $\theta_1$ is small, the dust is not diverted, and the performance deteriorates. As illustrated in Table 1, the noise performance is ⊙ when the angle $\theta_1$ is 0° and x when the angle $\theta_1$ is 90°. The antifouling performance is ⊙ when the angle $\theta_1$ is 90° and x when the angle $\theta_1$ is 0°. When the angle $\theta_1$ of the inclined passage 54 is around 33°, both the noise performance and the antifouling performance are not impaired, and the result becomes ◯. As described above, the shape of the inclined passage portion 54 hides the parallel passage portion 55 so as not to be exposed in a case where the inlet opening 52 is viewed from the upstream side, and furthermore, the angle $\theta_1$ is set as gently as possible so as to reduce the bending loss. It can be understood that a configuration having an angle is preferable.

The lower surface 62 of the inclined passage portion 54 has an introduction surface that is exposed when viewed from the front and directly receives the gas to be measured flowing through the main passage 23. The introduction surface has a curved surface that is convexly curved forward and an inclined surface that is continuously inclined at a curvature vertex of the curved surface. The introduction surface includes, as a curved surface, a first curved surface 62a curved with a curvature radius Ra so as to move forward as it moves upward from the lower end of the inlet opening 52, and a second curved surface 62b curved with a curvature radius Rb so as to move rearward as moving upward from the upper end of the first curved surface 62a. Further, the second curved surface 62b has an inclined surface 62c which is inclined so as to rise as it moves rearward continuously to the curvature vertex P which is the upper end of the second curved surface 62b. The curvature vertex P is arranged on an introduction surface that is exposed in a case where the inlet opening 52 is viewed from the main flow direction F of the gas to be measured. As described above, since the curvature vertex P is arranged on the introduction surface, the gas to be measured flowing into the inclined passage portion 54 from the inlet opening 52 can be smoothly guided, and the noise performance of the flow rate detection unit 43 is improved, and detection accuracy can be increased.

The first curved surface 62a and the second curved surface 62b of the introduction surface smoothly distribute the gas that has entered the inclined passage portion 54 from the inlet opening 52 up and down, the gas to be measured is guided to the downstream side of the inclined passage portion 54 while suppressing the separation vortex in the inclined passage portion 54, and the matter other than the gas to be measured is guided below the tip portion 32b of the housing 32 to escape from the inclined passage portion 54. Therefore, the amount of foreign matter flowing into the auxiliary passage 51 from the inlet opening 52 can be reduced, and the stain resistance of the flow rate detection unit 43 can be improved.

The first curved surface 62a of the introduction surface has a small effect on noise performance because it guides the matter other than the gas to be measured, and the curvature radius Ra of the first curved surface 62a is smaller than the curvature radius Rb of the second curved surface 62b. The height of the housing 32 in the vertical direction (Z direction) can be reduced. Therefore, the height of the thermal flowmeter 15 can be reduced, and in a case where the thermal flowmeter 15 is attached to the secondary air passage having a small cross-sectional area, a part of the thermal flowmeter 15 can be prevented from largely protruding outward.

The parallel passage portion 55 extends from the rear end 56 of the inclined passage portion 54 toward the outlet opening 53 with a substantially constant cross-sectional area. A throttle portion of which the cross-sectional area is reduced as moving to the outlet opening 53 is provided at the rear end. The throttle portion of the parallel passage portion 55 can increase the flow velocity of the gas to be measured passing through the parallel passage portion 55, and the influence of the separation vortex formed around the housing 32 with respect to the gas to be measured passing through the auxiliary passage 51 can be reduced, and the flow rate can be stabilized.

Figure 7:
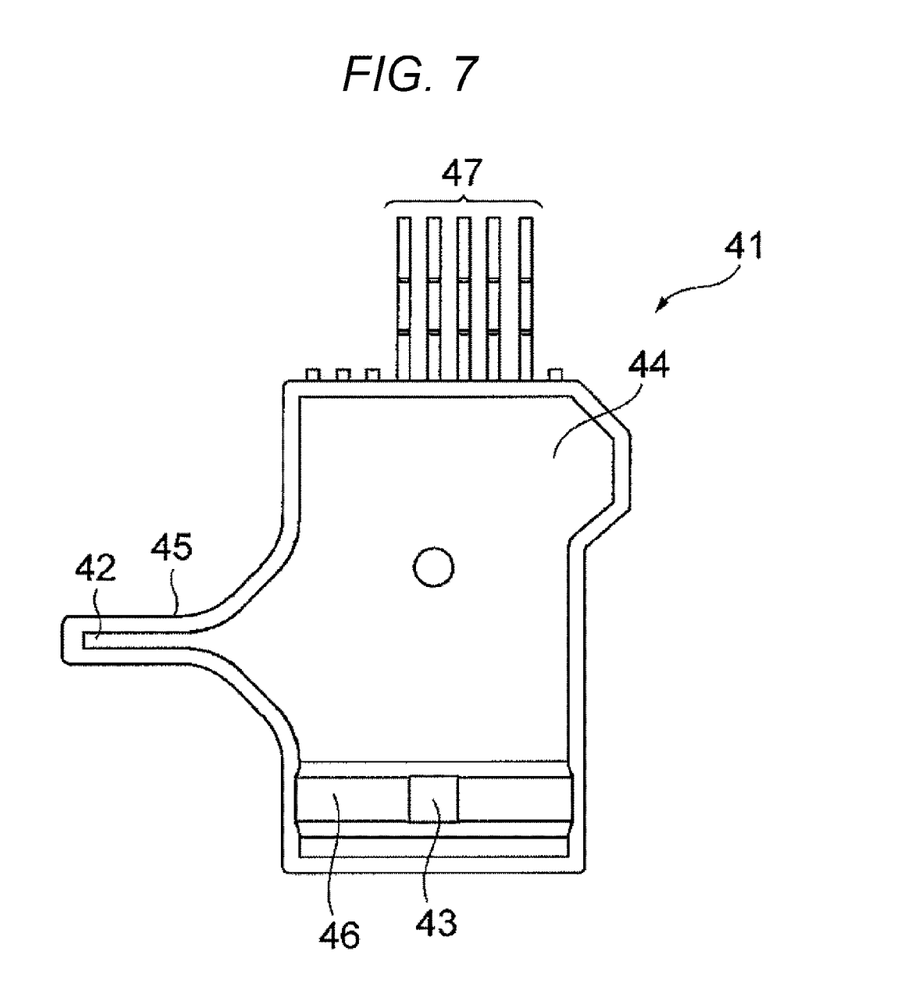
FIG. 7 is an external view of a chip package.

FIG. 7 is an external view of a chip package.

In this embodiment, a chip package 41 having the temperature detection unit 42 and the flow rate detection unit 43 is incorporated in the housing 32. The flow rate detection unit 43 is provided in the chip package 41, and is arranged in the parallel passage portion 55 by the chip package 41.

The chip package 41 mounts a plurality of sensor chips such as a thermal type flow rate detection sensor and a temperature sensor, an arithmetic circuit component such as an LSI, and an electronic circuit component such as a capacitor and an electric resistor on a lead frame to be integrally formed with a plastic or thermosetting mold resin. The chip package 41 has a package body 44 having a substantially rectangular flat plate shape in plan view.

The package body 44 has the protruding portion 45 protruding forward from the center of one side, and a temperature sensor forming the temperature detection unit 42 is disposed at the tip of the protruding portion 45. In addition, a groove 46 is formed on the surface of the package body 44 and at a position on the front end side so as to extend in the front-rear direction, and a thermal type flow rate detection sensor forming the flow rate detection unit 43 is disposed to be exposed at an intermediate position in the extending direction of the groove 46. A plurality of outer leads 47 are provided on the upper end of the package body 44, and are electrically connected to the outside so that signals can be output.

In the chip package 41, as illustrated in FIGS. 5 and 6, the package body 44 extends vertically in the Z direction in the auxiliary passage 51 so as to divide the auxiliary passage 51 into two parts in the X direction. The groove 46 and the flow rate detection unit 43 are disposed in the housing 32 so as to be located in the auxiliary passage 51. In the auxiliary passage 51, a throttle 33 is provided at a position facing the flow rate detection unit 43 of the parallel passage portion 55. The throttle 33 protrudes toward the flow rate detection unit 43 and forms a predetermined gap with the flow rate detection unit 43, and speeds up the flow rate of the gas to be measured that passes in a gap with the flow rate detection unit 43 and improve detection accuracy.

In this embodiment, as illustrated in FIG. 8, a pair of rectifying plates 34 are provided on both left and right sides of the inlet opening 52 of the auxiliary passage 51. The pair of rectifying plates 34 protrude forward from the side of the inlet opening 52. When the gas to be measured flowing through the main passage 23 flows into the auxiliary passage 51 from the inlet opening 52, the pair of rectifying plates 34 reduces the generation of the separation vortex due to the rapid contraction, and stabilizes the flow of the gas to be measured in the auxiliary passage 51.

Figure 10:
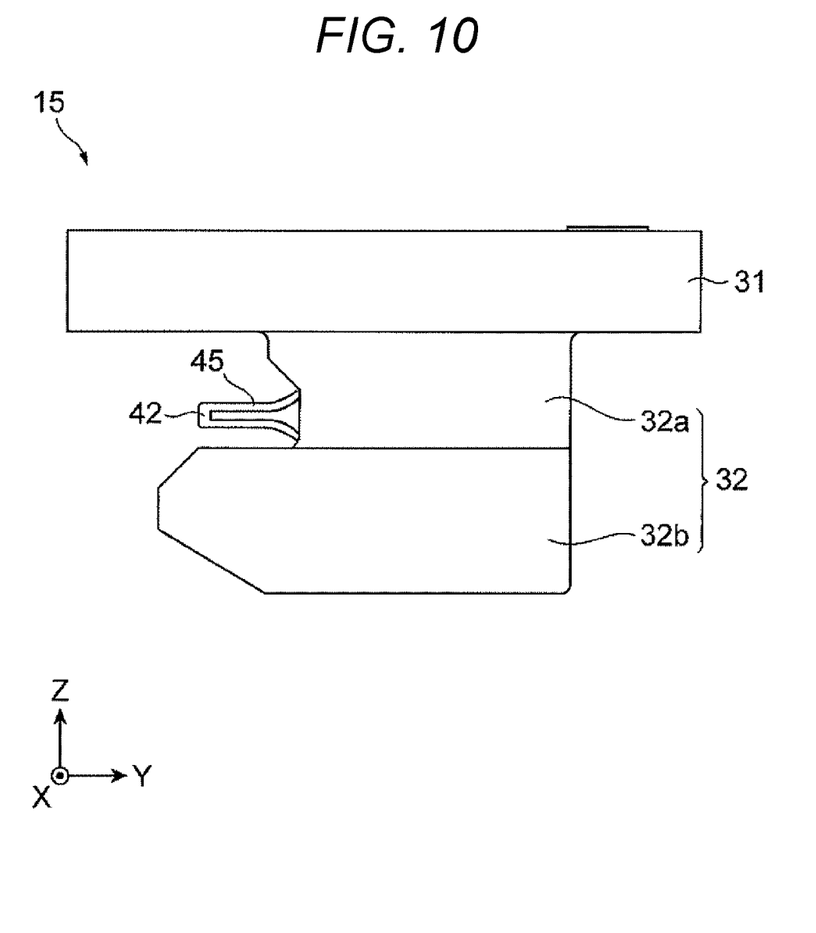
FIG. 10 is a diagram illustrating a modification of the thermal flowmeter of the first embodiment.
Figure 11:
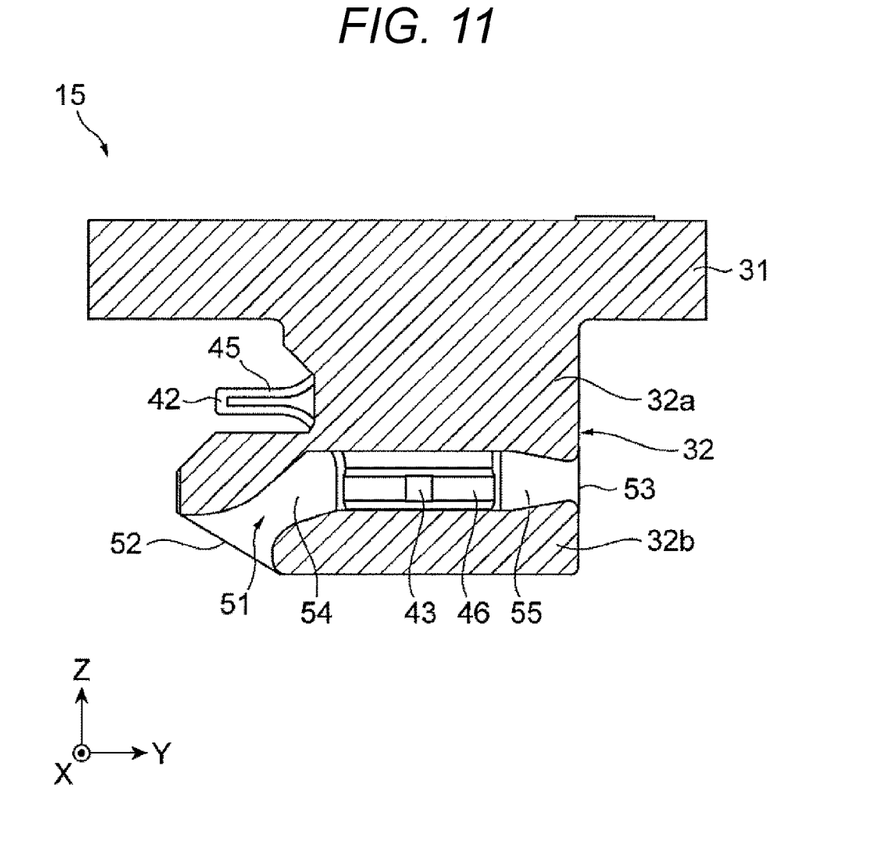
FIG. 11 is a cross-sectional view of the thermal flowmeter illustrated in FIG. 10.

FIG. 10 is a diagram in which the pair of rectifying plates 34 is omitted, and FIG. 11 is a cross-sectional view of FIG. 10.

In a case where the generation of the separation vortex in the auxiliary passage 51 is suppressed by the inclination degree of the inlet opening 52 and the shape of the inclined passage portion 54, the pair of rectifying plates 34 can be omitted as illustrated in FIGS. 10 and 11.

According to the thermal flowmeter 15 of this embodiment, there are provided the inlet opening 52 that opens while being inclined with respect to the main flow direction F of the gas to be measured which flows through the main passage 23, and the inclined passage 54 which extends from the inlet opening 52 in the same inclined direction as the inlet opening 52 with respect to the main flow direction F of the gas to be measured. Therefore, the size is reduced by reducing the height compared to the conventional structure such as a cyclone bypass or a branch passage. It is possible to achieve both measurement accuracy and antifouling performance.

Second Embodiment

Figure 12:
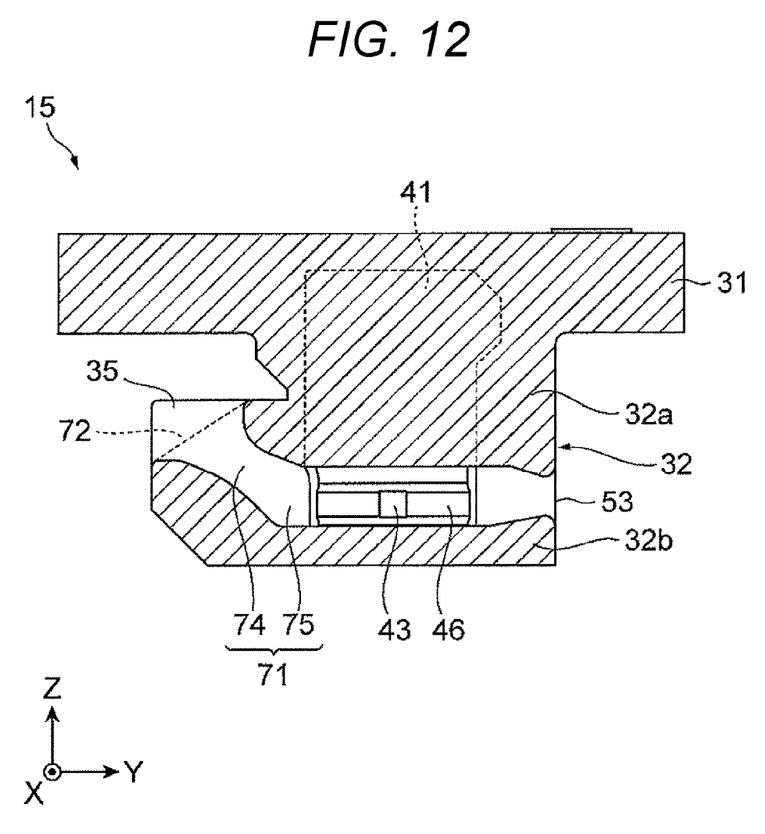
FIG. 12 is a cross-sectional view of a thermal flowmeter according to a second embodiment.

Next, a second embodiment of this invention will be described with reference to FIG. 12. FIG. 12 is a cross-sectional view of a thermal flowmeter of the second embodiment, and is a diagram corresponding to FIG. 5 of the first embodiment. A feature of this embodiment is that the inclination directions of the inlet opening and the inclined passage are opposite to those in the first embodiment. The same components as those of this embodiment are denoted by the same reference numerals, and detailed description thereof will be omitted.

An auxiliary passage 71 is provided at the tip portion 32b of the housing 32 of the thermal flowmeter 15. The auxiliary passage 71 is formed so as to extend in the front-rear direction between an inlet opening 72 opening forward and an outlet opening 53 opening rearward. The auxiliary passage 71 is defined as a passage having a closed cross section such as a rectangle or a circle whose upper, lower, left and right sides are surrounded. The inlet opening 72 is formed at the upstream end of the auxiliary passage 51. The outlet opening 53 is formed at the downstream end of the auxiliary passage 71.

The inlet opening 72 of the auxiliary passage 71 opens at an angle to the main flow direction F of the gas to be measured flowing through the main passage 23. The inlet opening 72 is formed at a predetermined angle with respect to a direction orthogonal to the main flow direction F so as to open toward the pedestal 31. The inlet opening 72 has an upper end located rearward than a lower end, and opens forward and obliquely upward so as to have a predetermined elevation angle.

The auxiliary passage 71 includes an inclined passage 74 extending in a direction inclined with respect to the main flow direction F of the gas to be measured flowing from the inlet opening 72 through the main passage 23, and a parallel passage portion 75 extending parallel to the main flow direction F of the gas to be measured continuously with the rear end of the inclined passage 74 and connected to the outlet opening 53. The inclined passage 74 is inclined by a predetermined angle with respect to the front-rear direction (Y direction) so as to gradually separate from the pedestal 31 of the housing 32 as it moves rearward from the inlet opening 72.

The lower surface of the inclined passage portion 74 is curved with a relatively large curvature radius, so that a separation vortex can be prevented from being generated when the gas to be measured passes. The lower end of the upper surface of the inclined passage portion 74 is disposed at a position lower than a lower end of the inlet opening 72, and the upper surface guides the gas to be measured flowing into the auxiliary passage 71 from the inlet opening 72 to guide the gas to be measured. The orientation can be changed diagonally. Therefore, the inclined passage portion 74 can prevent the gas to be measured which has flown from the inlet opening 72 into the auxiliary passage 71 from directly reaching the flow rate detection unit 43 along the Y direction. The antifouling performance of the portion 43 can be ensured.

The upper surface of the inclined passage 74 has an introduction surface that is exposed when viewed from the main flow direction F of the gas to be measured and directly receives the gas to be measured flowing through the main passage 23. The introduction surface is a first curved surface which is curved with a curvature radius Ra so as to move forward as it moves downward from the upper end of the inlet opening 72, and a second curved surface which is curved with a curvature radius Rb so as to move rearward as moving downward from the lower end of the first curved surface.

The first curved surface and the second curved surface of the introduction surface abut on the gas that has entered the inclined passage portion 74 from the inlet opening 72 and smoothly distribute the gas up and down, the gas to be measured is guided to the downstream side of the inclined passage portion 74 while suppressing the separation vortex in the inclined passage portion 74, and the matter other than the gas to be measured is guided above the tip portion 32b of the housing 32 to escape from the inclined passage portion 74. Therefore, the amount of foreign matter flowing into the auxiliary passage 71 from the inlet opening 72 can be reduced, and the stain resistance of the flow rate detection unit 43 can be improved.

The parallel passage portion 75 extends from the rear end of the inclined passage portion 74 toward the outlet opening 53 with a substantially constant cross-sectional area. A throttle portion of which the cross-sectional area is reduced is provided at the rear end near the outlet opening 53. The throttle portion of the parallel passage portion 75 can increase the flow velocity of the gas to be measured passing through the parallel passage portion 75, and the influence of the separation vortex formed around the housing 32 with respect to the gas to be measured passing through the auxiliary passage 71 can be reduced.

In this embodiment, the chip package 41 having the flow rate detection unit 43 is incorporated in the housing 32. The chip package 41 has only the flow rate detection unit 43, and the temperature detection unit 42 in the first embodiment is omitted. The flow rate detection unit 43 is disposed in the parallel passage portion 75 by the chip package 41.

According to the thermal flowmeter 15 of this embodiment, there are provided the inlet opening 72 that opens while being inclined with respect to the main flow direction F of the gas to be measured which flows through the main passage 23, and the inclined passage 74 which extends from the inlet opening 72 in the same inclined direction as the inlet opening 72 with respect to the main flow direction F of the gas to be measured. Therefore, the size is reduced by reducing the height compared to the conventional structure such as a cyclone bypass or a branch passage. It is possible to achieve both measurement accuracy and antifouling performance.

In each of the above-described embodiments, the case where the flow rate detection unit 43 is provided in the chip package 41 has been described as an example. However, this invention is not limited to such a configuration, and may be provided on a circuit board, for example.

Hitherto, the embodiments of the invention have been described, but the invention is not limited to the embodiments. Various modifications may be made within a scope not departing from the spirit of the invention disclosed in claims. For example, the above-described embodiments of the invention have been described in detail in a clearly understandable way, and are not necessarily limited to those having all the described configurations. In addition, some of the configurations of a certain embodiment may be replaced with the configurations of the other embodiments, and the configurations of the other embodiments may be added to the configurations of the subject embodiment. In addition, some of the configurations of each embodiment may be omitted, replaced with other configurations, and added to other configurations.

REFERENCE SIGNS LIST 15 thermal flowmeter
23 main passage
31 pedestal
32 housing
32a base portion
32b tip portion
34 rectifying plate
41 chip package
42 temperature detection unit
43 flow rate detection unit
44 package body
51 auxiliary passage
52 inlet opening
53 outlet opening
54 inclined passage
55 parallel passage portion
56 rear end
61 upper surface
62 lower surface
62a first curved surface
62b second curved surface
P curvature vertex

The invention claimed is:

1. A thermal flowmeter, in which a housing is disposed in a main passage through which the gas to be measured flows, and the gas to be measured is taken from the main passage into an auxiliary passage provided in the housing, and a flow rate of the gas to be measured is measured by a flow rate detection unit disposed in the auxiliary passage,
wherein the auxiliary passage includes
an inlet opening that opens to be inclined with respect to a main flow direction of the gas to be measured flowing through the main passage,
an inclined passage portion that extends in a direction inclined with respect to the main flow direction of the gas to be measured flowing through the main passage from the inlet opening,
a parallel passage portion bent at an end of the inclined passage portion and extending parallel to the main flow direction of the gas to be measured flowing through the main passage, and
when an inside of the inclined passage portion is viewed from the inlet opening along the main flow direction of the gas to be measured, the parallel passage portion is disposed such that the parallel passage portion is displaced in a direction perpendicular to the main flow direction of the gas to be measured and is not exposed, and the flow rate detection unit is disposed in the middle of the passage of the parallel passage portion.

2. The thermal flowmeter according to claim 1, further comprising:
a pedestal that fixes the housing to the main passage,
wherein the inlet opening is open in a direction away from the pedestal, and
wherein the inclined passage portion is inclined in a direction gradually approaching the pedestal as moving along the main flow direction of the gas to be measured from the inlet opening.

3. The thermal flowmeter according to claim 2,
wherein the inclined passage portion has an introduction surface that is exposed when viewed from the main flow direction of the gas to be measured, and
wherein the introduction surface has a curved surface convexly curved forward in the main flow direction of the gas to be measured, and an inclined surface continuously inclined at a curvature vertex of the curved surface.

4. The thermal flowmeter according to claim 1,
wherein the auxiliary passage has an outlet opening, and a throttle portion having a gradually decreasing cross-sectional area as moving toward the outlet opening is provided.

5. The thermal flowmeter according to claim 1,
wherein a flow rectifying plate is provided on a side of the inlet opening.

6. The thermal flowmeter according to claim 1,
wherein the inclined passage portion is inclined at an inclination angle of 25° or more and 70° or less with respect to the main flow direction of the gas to be measured.

* * * * *